Patented Jan. 4, 1949

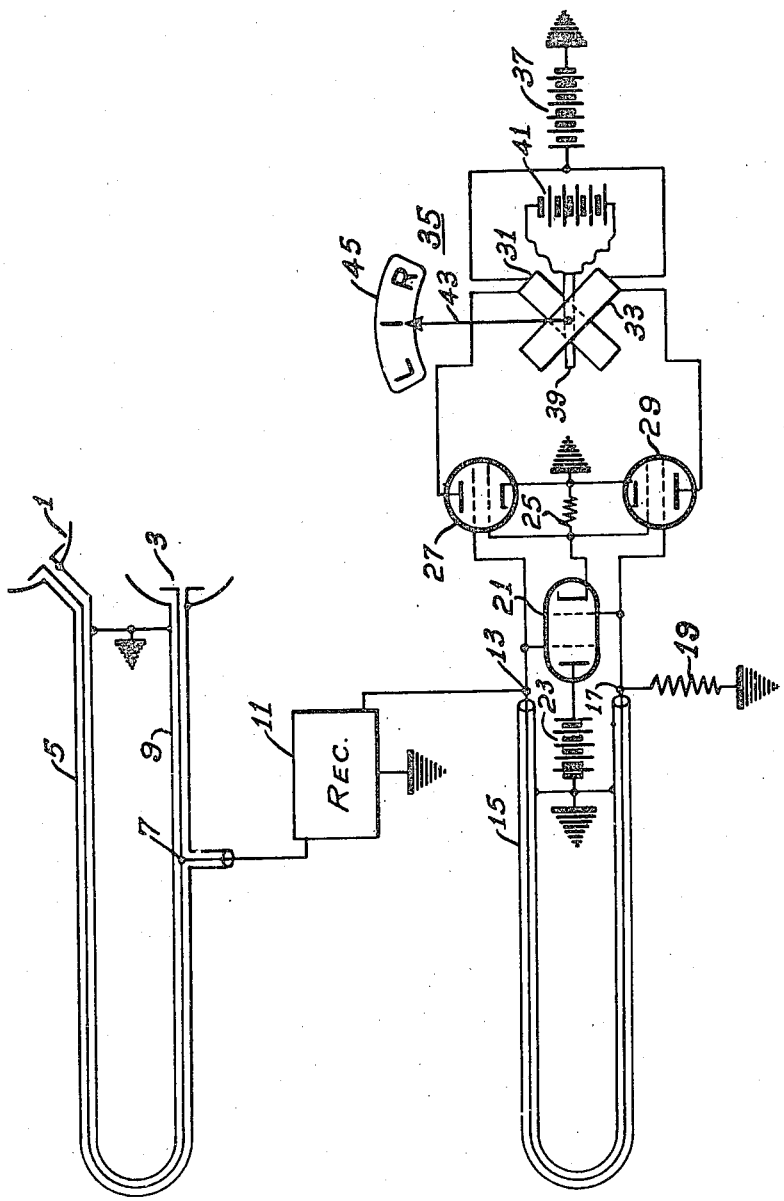

2,458,280

UNITED STATES PATENT OFFICE 2,458,280

RADIO DIRECTION FINDER

Nils E. Lindenblad, Rocky Point, N. Y., assignor to Radio Corporation of America, a corporation of Delaware Application July 1, 1946, Serial No. 680,611

7 Claims. (Cl. 343—123)

This invention relates to radio direction finders, and more particularly to systems for indicating direction of arrival of pulse modulated radio signals.

The principal object of the present invention is to provide improved methods of and means for effecting an extremely sharp or critical indication of direction.

Another object is to provide improved methods of and means for indicating the ratio of the amplitudes of the signals derived from a pulse modulated radiation field by two differently directed antennas.

A further object of this invention is to provide improved methods of and means for demodulating and amplifying in a single channel, two coincidental pulse modulated signals, thus obtaining the advantages of a double channel system while avoiding the objections thereto, such as necessity for equalizing gains and the duplication of various components.

The invention will be described with reference to the accompanying drawing, which is a schematic circuit diagram of a typical embodiment of the invention.

Two directive antennas, 1 and 3, are oriented with their directive axes at a small angle to each other, with their response patterns overlapping to provide a line of equi-signal response. The antennas 1 and 3 are rotatable together as a unit, to allow positioning of the equi-signal line at any required azimuth.

The antenna 1 is connected through a transmission line 5 to a junction point 7, and the antenna 3 is connected similarly through a line 9 to the point 7. The line 5 is longer than the line 9 by a predetermined amount which is not critical, but must be enough to provide a delay somewhat greater than the pulse duration of the signals with which the equipment is to operate.

The point 7 is connected to the input of a receiver 11. The output of the receiver 11 is applied to a point 13 at one end of a transmission line 15. The length of the line 15 is equal to the difference in length of the lines 5 and 9. The line 15 is terminated at its other end 17 by a resistor 19, having a resistance equal to the characteristic impedance of the line 15.

The points 13 and 17 are connected to respective control grids of an electron discharge tube 21, which is constructed so that its anode current may be controlled by varying the voltage at either of its control grids. The tube 21 may be of the type known in the radio receiver art as a 6L7, and ordinarily used as a frequency convertor for superheterodynes. Said type includes further grids (screen and suppressor) which are not shown in the drawing, since their functions are not essential to the operation of the present system. The tube 21 is provided with an anode supply source 23.

A resistor 25 is included in the cathode circuit of the tube 21, and serves both as a load and as a biassing means. The cathode of the tube 21 is also connected to corresponding control grids of a pair of tubes 27 and 29, which are similar to the tube 21. The other control grids of the tubes 27 and 29 are connected to the points 13 and 17 respectively at the ends of the line 15. The tubes 27 and 29 may be provided, if necessary, with any conventional biassing means, such as cathode circuit resistors, not shown.

The anodes of the tubes 27 and 29 are connected through the crossed stator windings 31 and 33 respectively of a ratio meter 35 to a D.-C. source 37. The rotor coil 39 is energized by a D.-C. source 41, and is coupled to a pointer 43 which is movable over a scale 45. The scale 45 may be calibrated numerically to indicate current ratio, or may be marked L-R like the deviation indicators commonly used with aircraft radio compasses.

The operation of the described system is as follows:

Pulses of radio frequency energy, from a transmitter whose direction is to be determined, will arrive at antennas 1 and 3 substantially simultaneously. The relative strengths of the signals induced in the two antennas will depend upon their angular positions with respect to the azimuth of the transmitter; if the equi-signal line coincides with the direction of the transmitter, the signal strengths will be the same.

The signal pulse in the antenna 3 will arrive at the point 7 at a time later than its arrival at the antenna by an amount depending on the length of the line 9. The signal picked up simultaneously by the antenna 1 will arrive at the point 7 still later, since the line 5 is longer than the line 9. Thus each pulse from the transmitter produces two separate pulses at the point 7, with amplitudes related to each other in accordance with the angle between the transmitter bearing and the equi-signal line of the antennas 1 and 3.

The first pulse, i. e. that from the antenna 3, is amplified and demodulated by the receiver 11, and applied to the point 13. This pulse is applied substantially immediately to the outer control grids of the tubes 21 and 27, but causes no flow of anode current in said tubes, since the inner control grids remain biassed off.

The second pulse, from the antenna 1, is amplified and demodulated and applied to the point 13 after a delay period depending upon the difference in length of the lines 5 and 9. Since both the first and second pulses go through the same receiver 11, they are delayed therein by equal amounts, and appear at the point 13 in the same time relationship and amplitude ratio as they had at the point 7.

At the instant the second pulse reaches the point 13, the first pulse reaches the point 17, having travelled through the line 15. Thus the first pulse appears on the inner control grid of the tube 21 at the same instant the second pulse reaches the outer control grid, and the tube 21 conducts momentarily. Current flows from the source 23 through the tube 21 and the resistor 25, producing a positive pulse across the resistor 25 and making the inner control grids of the tubes 27 and 29 positive by equal amounts.

Since the first pulse is at the outer control grid of the tube 29 at the same time as the pulse across the resistor 25 is applied to the inner control grid, the tube 29 conducts. Similarly, and simultaneously, the second pulse is at the outer control grid of the tube 27, causing it to conduct. A current flows from the source 37 through the winding 31 and the tube 27, and a second current flows from the source 37 through the winding 33 and the tube 29. The magnitudes of these two currents depend upon the conductivities of the tubes 27 and 29, and hence upon the amplitudes of the second and first pulses respectively.

The magnetic fields produced by the coils 31 and 33 combine to provide a resultant field, whose direction depends upon the ratio of the magnitudes of the two currents. The rotor coil moves to align its field with the resultant stator field, carrying with it the pointer 43.

When the two pulses, derived from the antennas 1 and 3 respectively, are of equal amplitudes, the coil 39 is in the position shown in the drawing and the pointer 43 is at the center of the scale 45, indicating that the equi-signal line of the antennas 1 and 3 coincides with the transmitter bearing. When the pulse derived from the antenna 3 is larger than that from the antenna 1, the tube 29 is more conductive than the tube 27 and the pointer 43 is deflected to the right, indicating that the transmitter bears to the right of the equi-signal line. Similarly, the pointer 43 is deflected to the left when the transmitter is to the left of the equi-signal line.

Although conduction through the tubes 27 and 29 occurs in short pulses, the inductances of the coils 31 and 33 and the mass of the coil 39 cause integration of the torque tending to move the pointer 43 to its proper position and hold it there, so that a substantially steady indication is provided.

Owing to the fact that indication is dependent on the ratio of the pulse amplitudes, variation of the actual pulse amplitudes over a wide range has substantially no effect on the accuracy of the system. However, it will be apparent to those skilled in the art that successful operation of the system may be obtained by omitting the ratio meter 35 and providing a differential meter between the anodes of the tubes 27 and 29. The deflection of the indicator will then depend upon the signal strength, as well as the deviation of the equi-signal line from the transmitter bearing.

The invention has been described as improved radio direction finder system for pulsed transmissions, of the type employing two antennas differently directed with overlapping response patterns. The signals derived from the two antennas are delayed by different amounts and passed sequentially through a common receiver and amplifier system. Further unequal delays are then introduced to bring the pulses back into time coincidence, for comparison of their amplitudes to operate an indicator.

I claim as my invention:

1. A direction finder for pulsed radio signals including means for deriving from a pulsed radiation field two separate pulse modulated signals whose amplitudes are related to each other in accordance with the angle between the wave front of said field and a predetermined reference line, means for delaying one of said signals with respect to the other by a predetermined amount such that the respective pulses of said delayed signal are non-coincident with those of said other signal; a single channel amplifier and demodulator system, means for applying both of said last mentioned signals to said system to produce a composite signal comprising voltage pulses corresponding respectively in amplitude and timing to the modulation of said applied signals; means for delaying said composite signal by an amount equal to the aforesaid delay of one of said pulse modulated signals, whereby alternate pulses of said composite signal are coincidental with intermediately alternate pulses of said delayed composite signal; pulse coincidence responsive means including two input circuits and responsive only to simultaneous excitation of both of said input circuits to provide an output pulse, and means for applying said composite signal and said delayed composite signal to said input circuits; another similar pulse coincidence responsive means and means for applying thereto said composite signal and the output of said first pulse coincidence responsive means, thereby to provide an output corresponding in amplitude to one of said pulses modulated signals, and a further pulse coincidence responsive means and means for applying thereto said delayed composite signal and the output of said first pulse coincidence means, thereby to provide an output corresponding in amplitude to the other of said modulated signals; angle indicator means including two input circuits and responsive to pulses applied coincidentally thereto to indicate the amplitude relationship of said pulses in terms of angle, and means for applying said two last mentioned output signals respectively to said input circuits.

2. A direction finder for pulsed radio signals including means for deriving from a pulsed radiation field two separate pulse modulated signals whose amplitudes are related to each other in accordance with the angle between the wave front of said field and a predetermined reference line, means for delaying one of said signals with respect to the other by a predetermined amount such that the respective pulses of said delayed signal are non-coincident with those of said other signal; a single channel amplifier and demodulator system, means for applying both of said last mentioned signals to said system to produce a composite signal comprising voltage pulses corresponding respectively in amplitude and timing to the modulation of said applied signals; means for delaying said composite signal by an amount equal to the aforesaid delay of one of said pulse modulated signals, whereby alternate pulses of said composite signal are coincidental with intermediately alternate pulses of said delayed composite signal; angle indicator means including two input circuits and responsive to pulses applied coincidentally thereto to indicate the amplitude relationship of said pulses in terms of angle, and means for applying said composite signal and said delayed composite signals respectively to said input circuits.

3. A system for amplifying and demodulating two separate pulse modulated signals, including means for delaying one of said signals with respect to the other by a predetermined amount such that the respective pulses of said delayed signal are non-coincident with those of said other signal; a single channel amplifier and demodulator system, means for applying both of said last mentioned signals to said system to produce a composite signal comprising voltage pulses corresponding respectively in amplitude and timing to the modulation of said applied signals; means for delaying said composite signal by an amount equal to the aforesaid delay of one of said pulse modulated signals, whereby alternate pulses of said composite signal are coincidental with intermediately alternate pulses of said delayed composite signal; pulse coincidence responsive means including two input circuits and responsive only to simultaneous excitation of both of said input circuits to provide an output pulse, and means for applying said composite signal and said delayed composite signal to said input circuits; another similar pulse coincidence responsive means and means for applying thereto said composite signal and the output of said first pulse coincidence responsive means, thereby to provide an output corresponding in amplitude to one of said pulse modulated signals, and a further pulse coincidence responsive means and means for applying thereto said delayed composite signal and the output of said first pulse coincidence means, thereby to provide an output corresponding in amplitude to the other of said pulse modulated signals.

4. A pulse radio direction finder system including two directive antennas with their directive patterns oriented at a predetermined angle to each other, a radio receiver, and two transmission lines connected respectively from said antennas to said receiver, said lines differing in length by a predetermined amount; a pulse coincidence responsive device including two input circuits, means for applying output from said radio receiver to one of said input circuits, means including a transmission line for applying output of said receiver to the other of said input circuits, the length of said last mentioned line being substantially the same as the difference in length of said first two lines, and means responsive to pulses which are coincidentally present in said two input circuits to indicate the ratio of the amplitudes of said coincidental pulses.

5. The method of amplifying and demodulating two coincidentally pulse modulated radio signals in a single channel, comprising the steps of delaying one of said signals with respect to the other so that the modulation pulses of said delayed signal are non-coincident with those of said other signal, combining said delayed signal and said other signal to provide a composite signal, amplifying and demodulating said composite signal, delaying said composite signal by an amount equal to the delay of said first mentioned signal, producing a control pulse in response to each coincidence of a pulse in said undelayed composite signal with a pulse in said delayed composite signal, producing an output pulse in response to each coincidence of a control pulse with a pulse in said undelayed composite signal, and producing separately a further output pulse in response to each coincidence of a control pulse with a pulse in said delayed composite signal.

6. The method of indicating the direction of arrival of pulsed radio waves, including the steps of deriving therefrom two separate signals modulated with simultaneous pulses whose respective amplitudes are related to each other in accordance with the angle between said direction of arrival and a predetermined reference line, delaying one of said signals with respect to the other so that the modulation pulses of said delayed signal are non-coincident with those of said other signal, combining said delayed signal and said other signal to provide a composite signal, amplifying and demodulating said composite signal, delaying said composite signal by an amount equal to the delay of said first mentioned signal, producing a control pulse in response to each coincidence of a pulse in said undelayed composite signal with a pulse in said delayed composite signal, producing a first output pulse in response to each coincidence of a control pulse with a pulse in said undelayed composite signal, producing separately a second output pulse in response to each coincidence of a control pulse with a pulse in said delayed composite signal, and indicating the relationship between the amplitudes of said first and second output pulses.

7. The method of conveying two coincidentally pulse modulated radio signals in a single channel, comprising the steps of delaying one of said signals with respect to the other so that the modulation pulses of said delayed signal are non-coincident with those of said other signal, combining said delayed signal and said other signal to provide a composite signal, conveying said composite signal, delaying said composite signal by an amount equal to the delay of said first mentioned signal, producing a control pulse in response to each coincidence of a pulse in said undelayed composite signal with a pulse in said delayed composite signal, producing an output pulse in response to each coincidence of a control pulse with a pulse in said undelayed composite signal, and producing separately a further output pulse in response to each coincidence of a control pulse with a pulse in said delayed composite signal.

NILS E. LINDENBLAD.

REFERENCES CITED

The following references are of record in the file of this patent:

UNITED STATES PATENTS

| Number | Name | Date |
| --- | --- | --- |
| 1,491,372 | Alexanderson | Apr. 22, 1924 |
| 2,257,594 | Chireix | Sept. 30, 1941 |